(12) United States Patent
Heck et al.

(10) Patent No.: US 6,213,563 B1
(45) Date of Patent: Apr. 10, 2001

(54) FULL FACE VEHICLE WHEEL

(75) Inventors: Thomas E. Heck, Monroe; Zvonko Dimovski, Sterling Hights, both of MI (US)

(73) Assignee: Haves Lemmerz International, Inc., Northville, MI (US)

(*) Notice: Subject to any disclaimer, the term of this patent is extended or adjusted under 35 U.S.C. 154(b) by 0 days.

(21) Appl. No.: 09/338,088

(22) Filed: Jun. 23, 1999

Related U.S. Application Data

(63) Continuation of application No. PCT/US97/24286, filed on Dec. 23, 1997.
(60) Provisional application No. 60/034,430, filed on Dec. 23, 1996.

(51) Int. Cl.$^7$ ........................................................ B60B 3/10
(52) U.S. Cl. .............................................................. 301/63.1
(58) Field of Search ........................ 301/63.1, 65, 95–99

(56) References Cited

U.S. PATENT DOCUMENTS

| | | | |
|---|---|---|---|
| 4,610,482 | * | 9/1986 | Overbeck et al. .................... 301/63.1 |
| 5,257,455 | * | 11/1993 | Iwatsuki et al. ................. 301/63.1 X |
| 5,295,304 | | 3/1994 | Ashley, Jr. . |
| 5,345,676 | | 9/1994 | Ashley, Jr. . |
| 5,435,632 | | 7/1995 | Gajor et al. . |
| 5,435,633 | | 7/1995 | Jaskierny . |
| 5,634,694 | * | 6/1997 | Murray et al. ....................... 301/63.1 |
| 5,639,147 | * | 6/1997 | Hill et al. ............................ 301/63.1 |

FOREIGN PATENT DOCUMENTS

85/02586    6/1985 (WO) .

OTHER PUBLICATIONS

Patent Abstracts of Japan, Publication No. 04305388, Publication Date Oct. 28, 1992.

* cited by examiner

*Primary Examiner*—Russell D. Stormer
(74) *Attorney, Agent, or Firm*—MacMillan, Sobanski & Todd, LLC

(57) ABSTRACT

This invention relates to an improved full face vehicle wheel including a wheel rim joined to a wheel disc. The wheel rim defines an axis and includes an inboard tire bead seat retaining flange, an inboard tire bead seat, an axially extending well, and an outboard tire bead seat. The outboard tire bead seat of the wheel rim terminates at an endmost surface. The wheel disc includes a body having a centrally located wheel mounting surface and an outer annular portion. The outer annular portion of the wheel disc defines an outboard tire bead seat retaining flange of the full face wheel. The outer annular portion of the wheel disc includes a protuberance formed therein. The protuberance defines a generally radially extending non-flat outer surface and a generally radially extending inner surface. The inner surface of the protuberance defines a fit-up surface for receiving the endmost surface of the wheel rim and a weld to join the wheel disc to the wheel rim. The protuberance in the outer flange of the wheel disc is effective to improve the styling of the full face wheel.

20 Claims, 15 Drawing Sheets

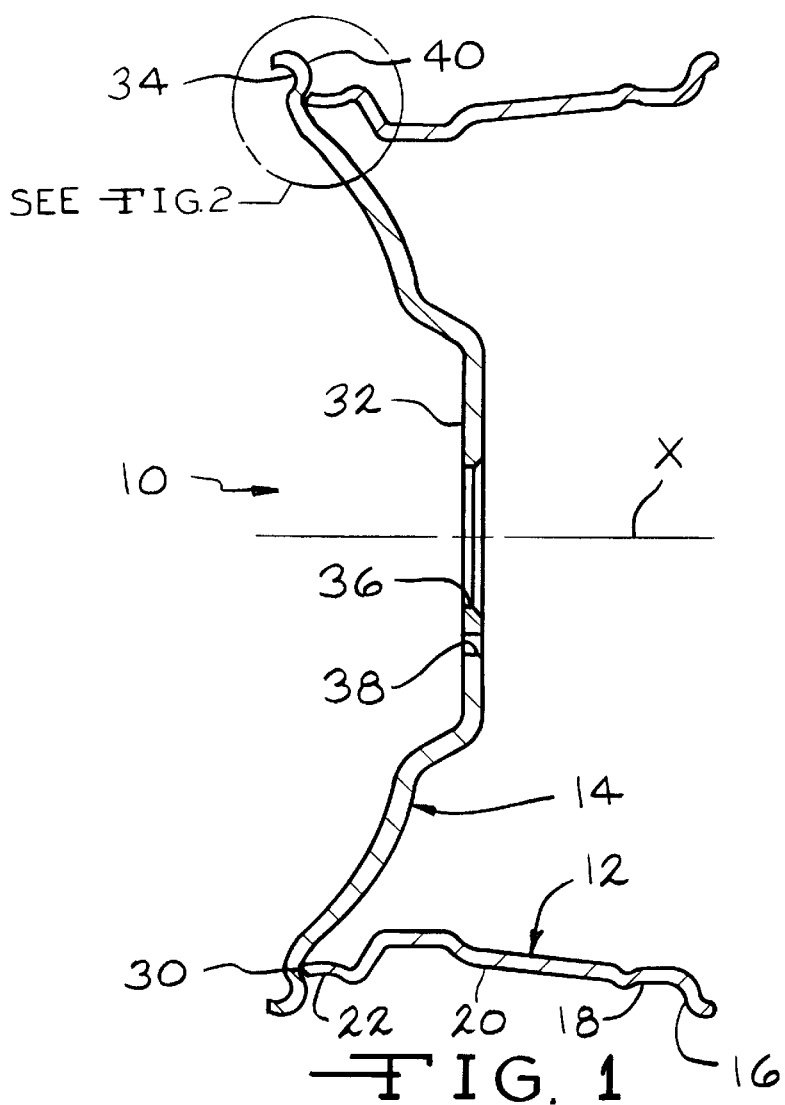
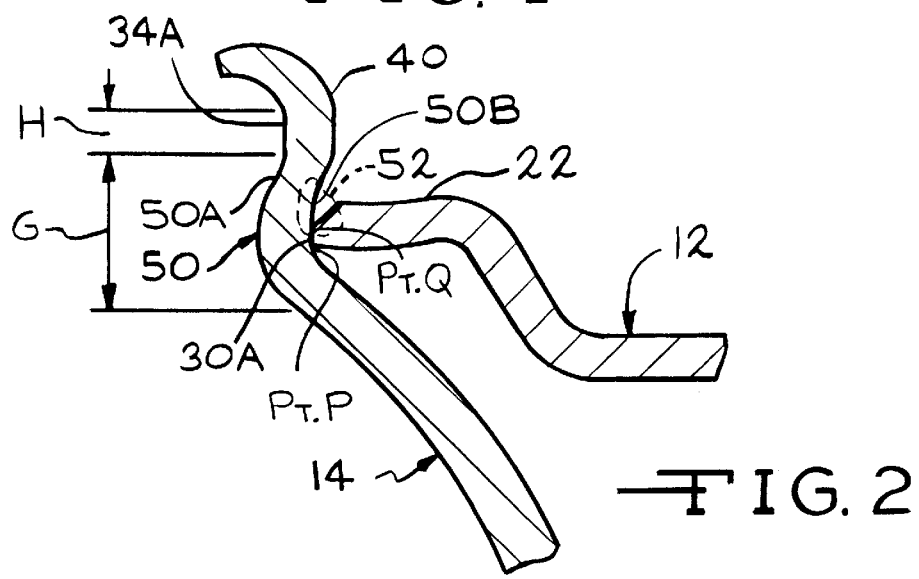

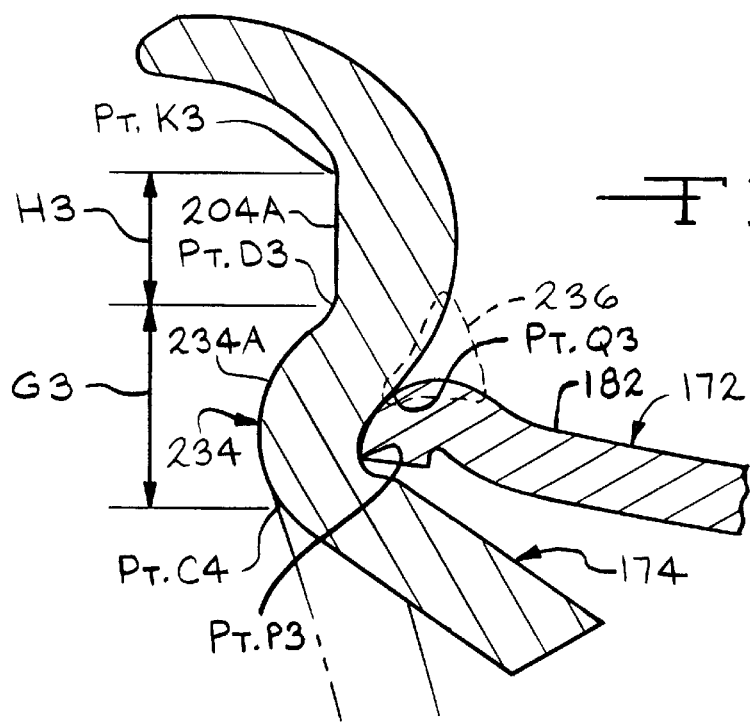
FIG. 14
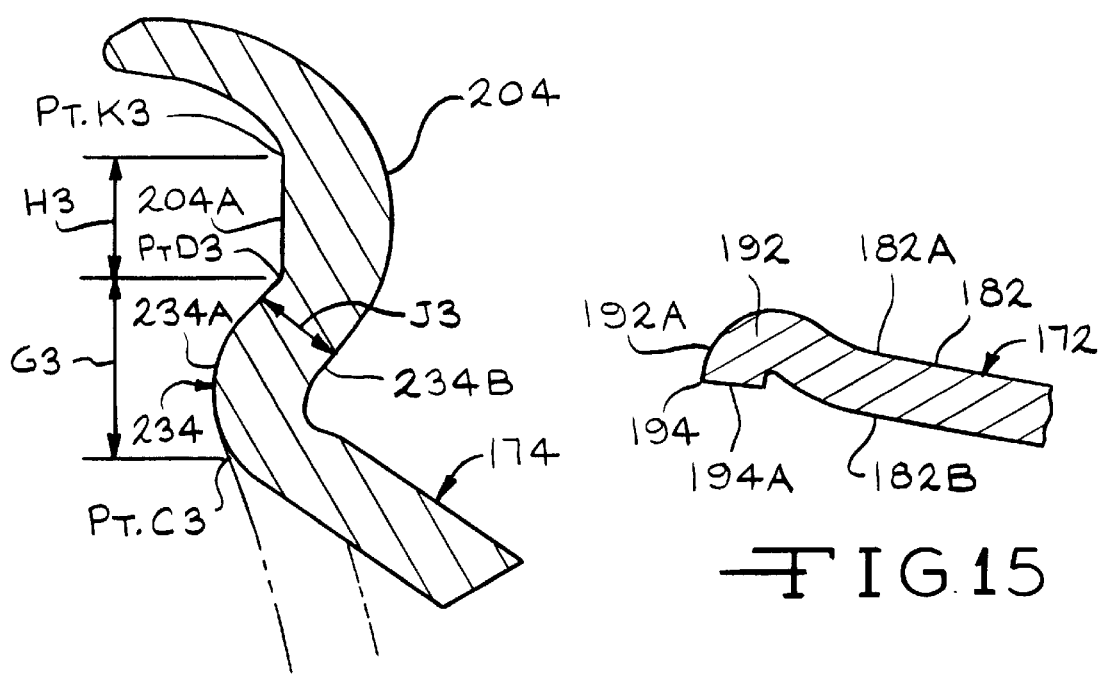
FIG. 15
FIG. 16

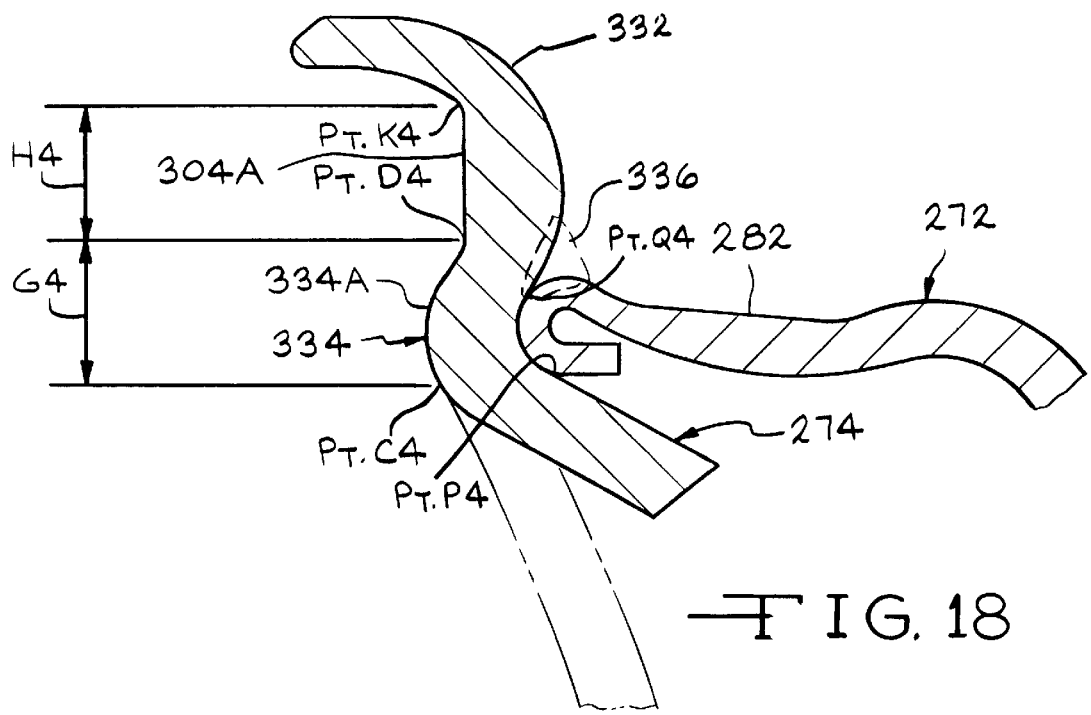
FIG. 18
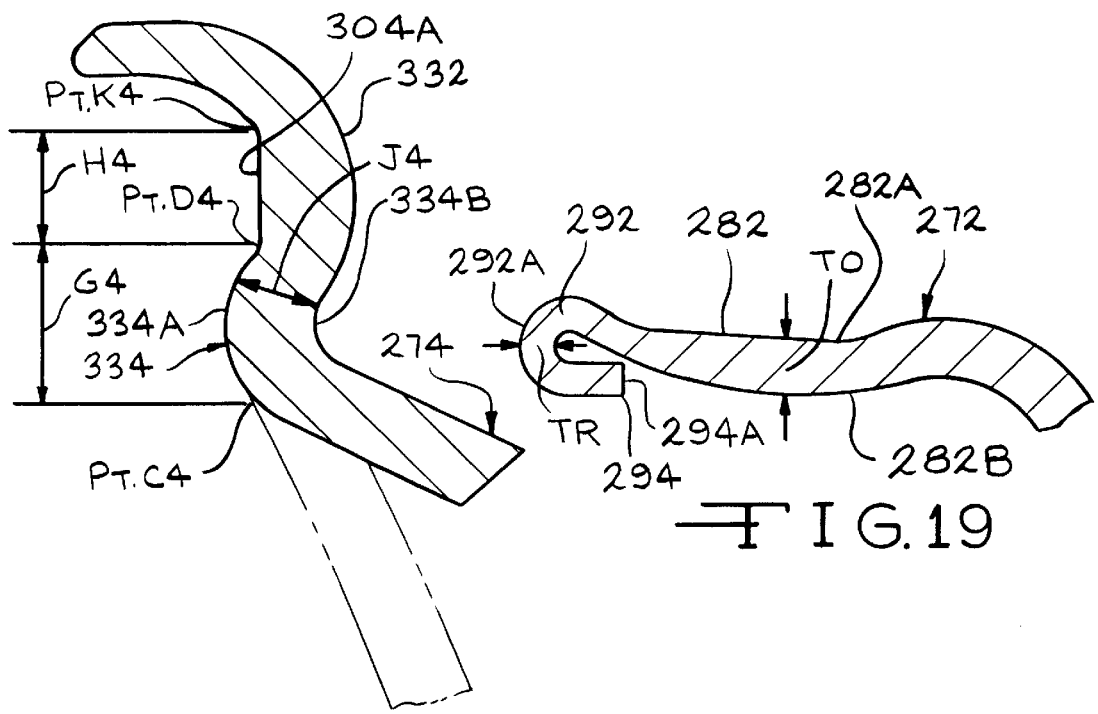
FIG. 19
FIG. 20

US 6,213,563 B1

FULL FACE VEHICLE WHEEL

CROSS-REFERENCE TO RELATED APPLICATIONS

This application is a continuation-in-part of PCT/US97/24286, filed Dec. 23, 1997, which claims the benefit of U.S. Provisional Application Ser. No. 60/034,430, filed Dec. 23, 1996.

BACKGROUND OF THE INVENTION

This invention relates in general to vehicle wheels and in particular to an improved full face vehicle wheel.

A conventional well-attached vehicle wheel is typically of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The wheel rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the well of the wheel rim by a weld.

A full face wheel is distinguished from other types of wheels by having a one-piece wheel disc construction. In particular, the full face wheel includes a "full face" wheel disc and a "partial" wheel rim. The full face wheel disc can be cast, forged, or fabricated from steel, aluminum, or other alloys. The full face wheel disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial wheel rim is fabricated from steel, aluminum, or other alloys, and includes an inboard tire bead seat retaining flange, an inboard tire bead seat, an axially extending well, and an outboard tire bead seat. In some instances, the outboard tire bead seat of the wheel rim and the outer annular portion of the wheel disc cooperate to form the outboard tire bead seat retaining flange of the full face wheel. In both types of constructions, the outboard tire bead seat of the wheel rim is positioned adjacent the outer annular portion of the wheel disc and a weld is applied to secure the wheel rim and the wheel disc together.

SUMMARY OF THE INVENTION

This invention relates to an improved full face vehicle wheel including a wheel rim joined to a wheel disc. The wheel rim defines an axis and includes an inboard tire bead seat retaining flange, an inboard tire bead seat, an axially extending well, and an outboard tire bead seat. The outboard tire bead seat of the wheel rim terminates at an endmost surface. The wheel disc includes a body having a centrally located wheel mounting surface and an outer annular portion. The outer annular portion of the wheel disc defines an outboard tire bead seat retaining flange of the full face wheel. The outer annular portion of the wheel disc includes a protuberance formed therein. The protuberance defines a generally radially extending non-flat outer surface and a generally radially extending inner surface. The inner surface of the protuberance defines a generally flat fit-up surface for receiving the endmost surface of said wheel rim and a weld to join said wheel disc to said wheel rim. The protuberance in the outer flange of the wheel disc is effective to reduce the radial length of an outer flat surface which is formed in the outer flange of the wheel disc and thereby improve the styling of the full face wheel.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a cross-sectional view of a first embodiment of a full face vehicle wheel constructed in accordance with the present invention.

FIG. 2 is an enlarged cross-sectional view of a portion of the wheel illustrated in FIG. 1 and showing a weld joint geometry for joining the wheel rim to the wheel disc to produce the full face vehicle wheel.

FIG. 14 is an enlarged cross-sectional view of a portion of the illustrated in FIG. 13.

FIG. 15 is a cross-sectional view of the wheel rim illustrated in FIG. 14.

FIG. 16 is a cross-sectional view of the wheel disc illustrated in FIG. 14.

FIG. 18 is an enlarged cross-sectional view of a portion of the wheel illustrated in FIG. 17.

FIG. 19 is a cross-sectional view of the wheel rim illustrated in FIG. 18.

FIG. 20 is a cross-sectional view of the wheel disc illustrated in FIG. 18.

DESCRIPTION OF THE PREFERRED EMBODIMENTS

Figure 3:
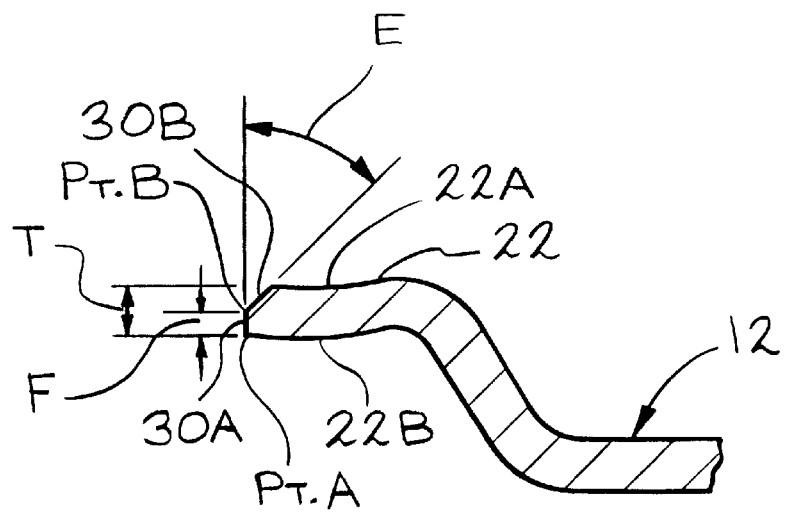
FIG. 3 is a cross-sectional view of the wheel rim shown illustrated in FIG. 2.

Referring now to the drawings, there is illustrated in FIG. 1 a first embodiment of a full face vehicle wheel, indicated generally at 10, constructed in accordance with the present invention. The full face vehicle wheel 10 includes a wheel rim 12 and a wheel disc 14 which are joined together during a welding operation. In the illustrated embodiment, the wheel rim 12 is a fabricated wheel rim formed from aluminum or alloys thereof and is similar to that disclosed in U.S. Pat. No. 5,435,633 to Jaskierny, the disclosure of which is incorporated herein by reference. Alternatively, the wheel rim 12 can be formed from other metals, such as steel, magnesium, or titanium.

The wheel rim 12 includes an inboard tire bead seat retaining flange 16, an inboard tire bead seat 18, a generally axially extending well 20, and an outboard tire bead seat 22. As best shown in FIG. 3, the outboard tire bead seat 22 includes an outer axially extending cylindrical surface 22A and an inner axially extending cylindrical surface 22B which is substantially parallel to the outer cylindrical surface 22A to define a generally constant thickness T through the entire length of the outboard tire bead seat 22. Typically, the thickness T of the wheel rim 12 in the region of the outboard tire bead seat is in the range of about 0.250 inch to about 0.275 inch for aluminum.

The outboard tire bead seat 22 of the wheel rim 12 termites at an axial endmost surface 30. The axial endmost surface 30 includes a radially extending first end surface 30A, and a non-radially extending chamfered second end surface 30B. The radially extending first end surface 38A extends from a point A to a point B to define a radial distance F, and the non-radially extending chamfered second end surface 30B is at an angle E relative to the radially extending first end surface 30A. Preferably, the non-radially extending chamfered second end surface 30B is formed during a machining operation to maintain tight tolerances.

In the illustrated embodiment, the wheel disc 14 is forged, cast, fabricated, or otherwise formed from aluminum and includes a generally centrally located wheel mounting surface 32 and an outer annular flange 34. Alternatively, the wheel disc 14 can be formed from other metals, such as steel, magnesium, titanium, or alloys thereof, and/or the wheel disc 14 can be formed from a different metal than that of the wheel rim 12. The wheel mounting surface 32 is provided with a centrally located pilot aperture 36 and a plurality of lug bolt receiving holes 38 (only one lug bolt hole 38 being illustrated) circumferentially spaced around the pilot aperture 36. The lug bolt receiving holes 38 receive lug bolts and nuts (not shown) for securing the wheel 10 on an axle (not shown) of a vehicle. The outer annular flange 34 of the wheel disc 14 defines an inboard tire bead seat retaining flange 40 of the wheel 10. The wheel disc 14 may also include a plurality of decorative openings or windows (not shown).

Figure 4:
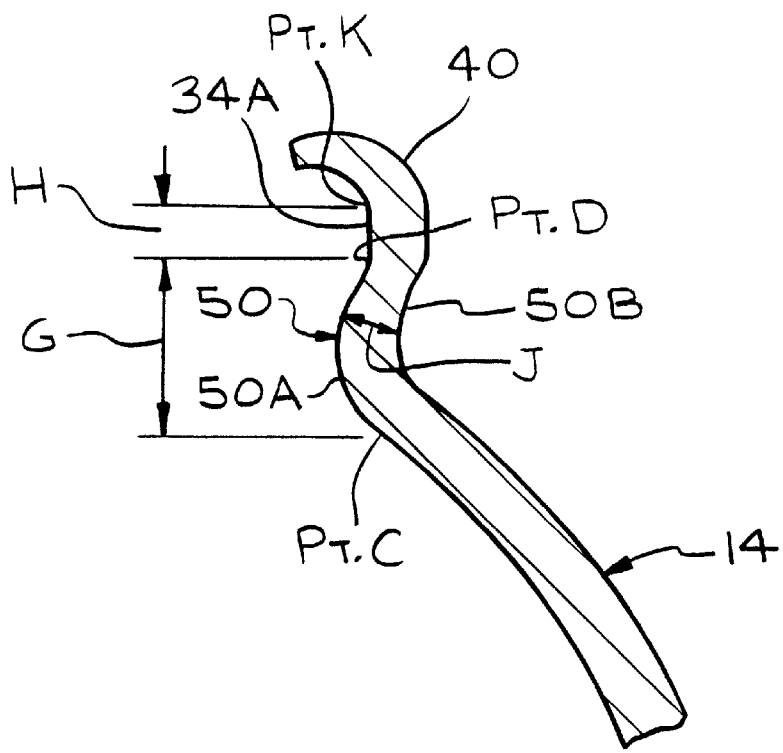
FIG. 4 is a cross-sectional view of the wheel disc illustrated in FIG. 2.

As best shown in FIG. 4, the outer annular flange 34 of the wheel disc 14 includes a generally non-flat, rounded or curved protuberance or "bulge", indicated generally at 50, formed therein. The protuberance 50 extends in a generally radial direction from approximately a point C to approximately a point D to define a radial length G. The protuberance 50 defines a generally radially extending non-flat outer surface 50A and a generally radially extending non-flat inner surface 50B. In this embodiment, the outer surface 50A is substantially parallel to the inner surface 50B to define a generally constant thickness J through the entire length G of the protuberance 50.

Typically, the thickness J of the wheel disc 14 in the region of the protuberance 50 is in the range of about 0.250 inch to about 0.40 inch for aluminum. The protuberance 50 is formed during the wheel disc forming process and may be formed by a suitable method, such as for example, by a stamping process, by a spinning process, or by combining stamping and spinning operations such as disclosed in U.S. Pat. No. 5,345,676 to Ashley, Jr. and U.S. Pat. No. 5,295,304 to Ashley, Jr., the disclosures of which are incorporated herein by reference. As will be wheel discussed, the inner surface 50B of the protuberance 50 defines a "fit-up" surface for receiving the axial endmost surface 30 of the wheel rim 12. Preferably, as shown in FIG. 2, the fit-up surface extends from about a point P to about a point Q, and is a generally flat surface formed by a suitable method, such as for example, by a machining operation or a stamping operation, to precise dimensions.

The outer flange 34 of the wheel disc 14 further defines a generally flat outer surface 34A which extends in a generally radial direction from approximately the point D to approximately a point K to define a radial length H.

As will be wheel discussed below, by forming the protuberance 50 in the outer flange 34 of the wheel disc 14, the length H of the outer flat surface 34A in the outer flange 34 of the wheel disc 14 is reduced compared to that of a similar sized prior art wheel disc for use in a similar prior art wheel construction.

To assemble the full face wheel 10, the axial endmost surface 30 of the wheel rim 12 is positioned adjacent the fit-up surface 50B of the wheel disc 14 in a predetermined position. In this position, the radially extending first end surface 30A of the wheel rim 12 abuts the inner surface 50B of the wheel disc 14 and the non-radially extending second end surface 30B of the wheel rim 12 is spaced from the inner surface 50B thereby forming a recess therebetween. The recess defines an annular groove which receives a circumferential weld 52 for joining the wheel disc 14 and the wheel rim 12 together to produce the full face wheel 10.

Figure 5:
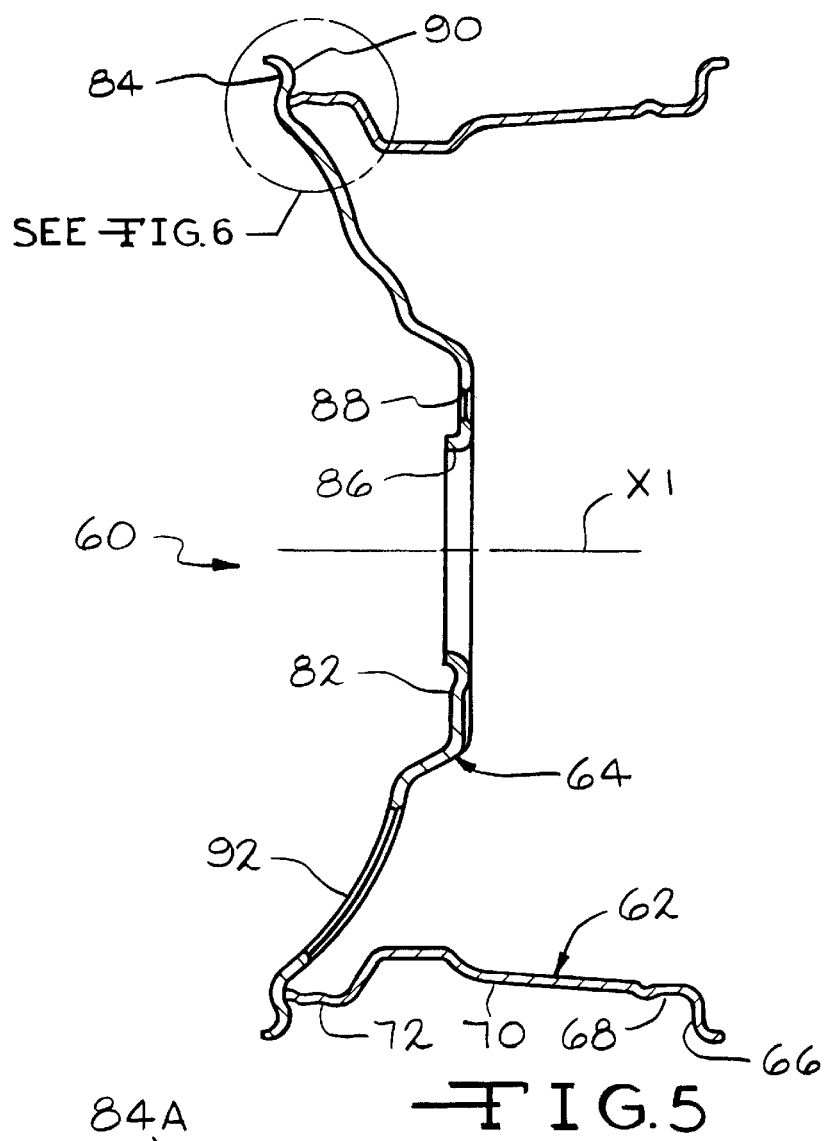
FIG. 5 is a cross-sectional view of a second embodiment of a full face vehicle wheel constructed in accordance with the present invention.

Turning now to FIG. 5, there is illustrated a second embodiment of a full face vehicle wheel, indicated generally at 60, constructed in accordance with the present invention. The full face vehicle wheel 60 includes a wheel rim 62 and a wheel disc 64 which are joined together during a welding operation.

The wheel rim 62 is a fabricated wheel rim formed from steel and is similar to that disclosed in U.S. Pat. No. 5,435,632 to Gajor et al., the disclosure of which is incorporated herein by reference. Alternatively, the wheel rim 62 can be formed from other metals, such as aluminum, magnesium, titanium, or alloys thereof. The wheel rim 62 includes an inboard tire bead seat retaining flange 66, an inboard tire bead seat 68, a generally axially extending well 70, and an outboard tire bead seat 72.

Figure 7:
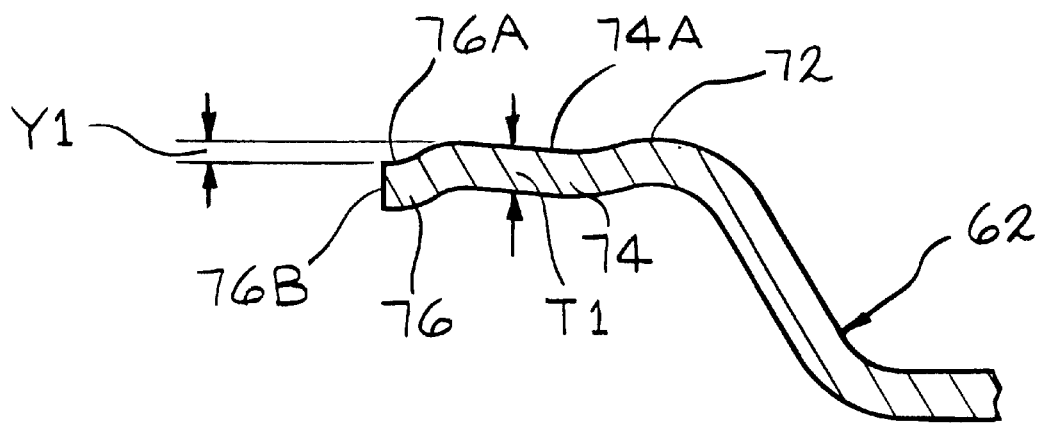
FIG. 7 is a cross-sectional view of the wheel rim shown illustrated in FIG. 6.

As best shown in FIG. 7, the outboard tire bead seat 72 of the wheel rim 62 includes a first section 74 and a second section 76. The first section 74 defines a first generally axially extending outer surface 74A, and a first section thickness T1. Typically, the first section thickness T1 is in the range of about 0.125 inch to about 0.150 inch for steel, and in the range of about 0.195 inch to about 0.250 inch for aluminum. The second section 76 defines a second generally axially extending outer surface 76A, and an axial endmost surface 76B. The second axial outer surface 76A is spaced radially inwardly relative to the first axial outer 74A by a distance Y1. Preferably, the distance Y1 is in the range of about one-quarter to three-quarters the thickness T1 of the first section 74, with a radially inwardly distance Y1 of approximately one-half the first section thickness T1 being preferred.

In the illustrated embodiment, the wheel disc 64 is forged, cast, fabricated, or otherwise formed from steel and includes a generally centrally located wheel mounting surface 82 and an outer annular flange 84. Alternatively, the wheel disc 64 can be formed from other metals, such as aluminum, magnesium, titanium, or alloys thereof, and/or the wheel disc 64 can be formed form a different metal than that of the wheel rim 62. The wheel mounting surface 82 is provided with a centrally located pilot aperture 86, and a plurality of lug bolt receiving holes 88 (only one lug bolt hole 88 being illustrated) circumferentially spaced around the pilot aperture 86. The lug bolt receiving holes 88 receive lug bolts and nuts (not shown) for securing the wheel 60 on an axle (not shown) of a vehicle. The outer annular flange 84 of the wheel disc 64 defines an inboard tire bead seat retaining flange 90 of the wheel 60. The wheel disc 64 may also include a plurality of decorative openings or windows 92 (only one window 92 being illustrated).

Figure 8:
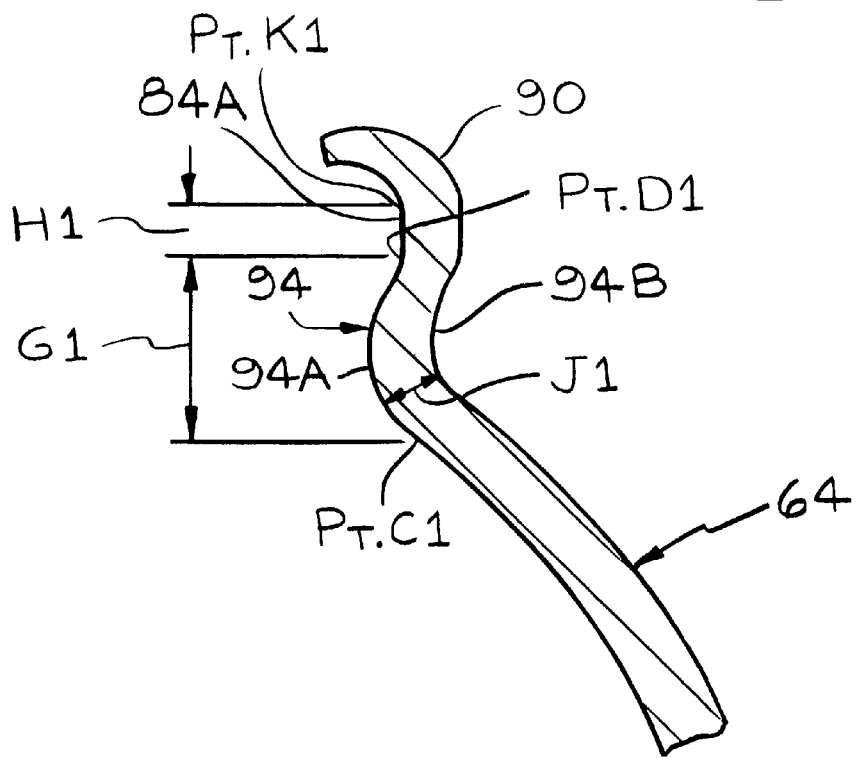
FIG. 8 is a cross-sectional view of the wheel disc illustrated in FIG. 6.

As best shown in FIG. 8, the outer annular flange 84 of the wheel disc 64 includes a protuberance, indicated generally at 94, formed therein. The protuberance 94 extends in a generally radial direction from approximately a point C1 to approximately a point D1 to define a radial length G1. The protuberance 94 defines a generally radially extending non-flat outer surface 94A and a generally radially extending non-flat inner surface 94B. In this embodiment, the outer surface 94A is substantially parallel to the inner surface 94B to define a generally constant thickness J1 through the entire length G1 of the protuberance 94 of the wheel disc 64.

Figure 6:
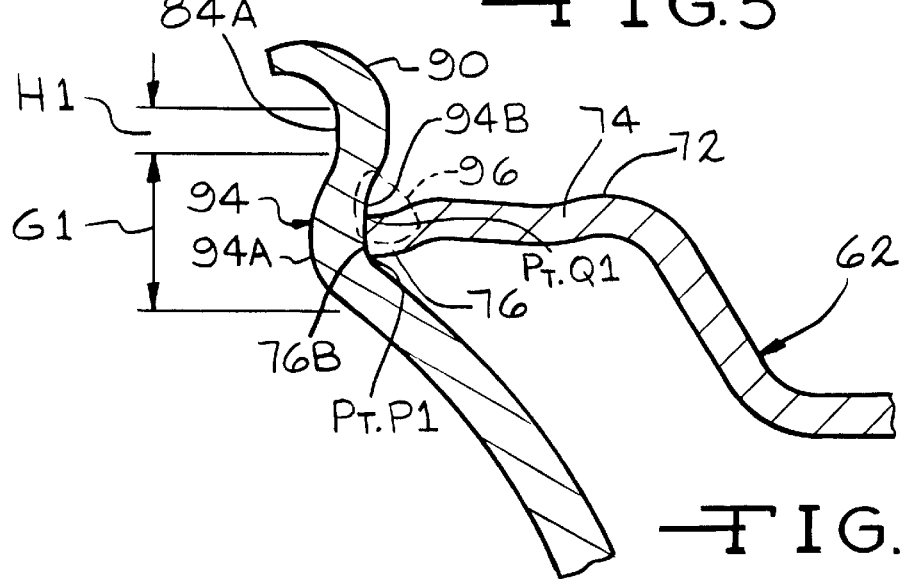
FIG. 6 is an enlarged cross-sectional view of a portion of the wheel illustrated in FIG. 5.

Typically, the thickness J1 of the wheel disc 64 in the region of the protuberance 94 is in the range of about 0.140 inch to about 0.250 inch for steel. The protuberance 94 is formed during the wheel disc forming process and may be formed by a suitable method, such as for example, by a stamping process, by a spinning process, or by combining stamping and spinning operations such as disclosed in U.S. Pat. No. 5,345,676 to Ashley, Jr. and U.S. Pat. No. 5,295,304 to Ashley, Jr. As will be discussed, the inner surface 94B of the protuberance 94 defines a "fit-up" surface for receiving the axial endmost surface 76B of the wheel rim 62. Preferably, as shown in FIG. 6, the fit-up surface extends from about a point P1 to about a point Q1, and is a generally flat surface formed by a suitable method, such as for example, by a machining operation or a stamping operation, to precise dimensions.

The outer flange 84 of the wheel disc 64 further defines a generally flat outer surface 84A which extends in a generally radial direction from approximately the point D1 to approximately a point K1 to define a radial length H1. As will be discussed below, by forming the protuberance 94 in the outer flange 84 of the wheel disc 64, the length H1 of the outer flat surface 84A in the outer flange 84 of the wheel disc 64 is reduced compared to that of a similar sized prior art wheel disc for use in a similar prior art wheel construction.

To assemble the full face wheel 60, the axial endmost surface 76B of the wheel rim 62 is positioned adjacent the fit-up surface 94B of the wheel disc 64 in a predetermined position. In this position, the radially extending second outer surface 76A of the wheel rim 62 is spaced from the inner surface 94B thereby forming a recess therebetween. The recess defines an annular groove which receives a circumferential weld 96 for joining the wheel disc 64 and the wheel rim 62 together to produce the full face wheel 60.

Figure 9:
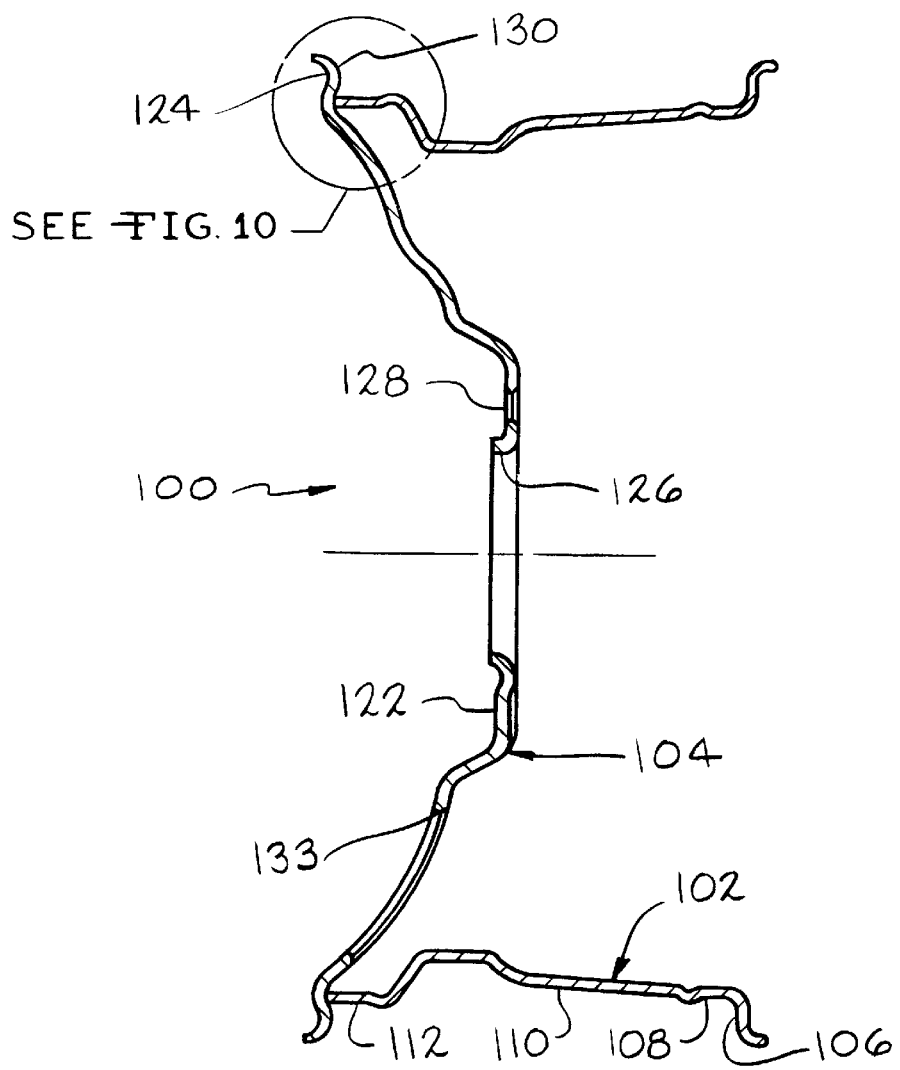
FIG. 9 is a cross-sectional view of a third embodiment of a full face vehicle wheel constructed in accordance with the present invention.

Turning now to FIG. 9, there is illustrated a third embodiment of a full face vehicle wheel, indicated generally at 100, constructed in accordance with the present invention. The full face vehicle wheel 100 includes a wheel rim 102 and a wheel disc 104 which are joined together during a welding operation.

The wheel rim 102 is a fabricated wheel rim formed from steel, aluminum, magnesium, titanium, or other alloys and includes an inboard tire bead seat retaining flange 106, an inboard tire bead seat 108, a generally axially extending well 110, and an outboard tire bead seat 112.

Figure 11:
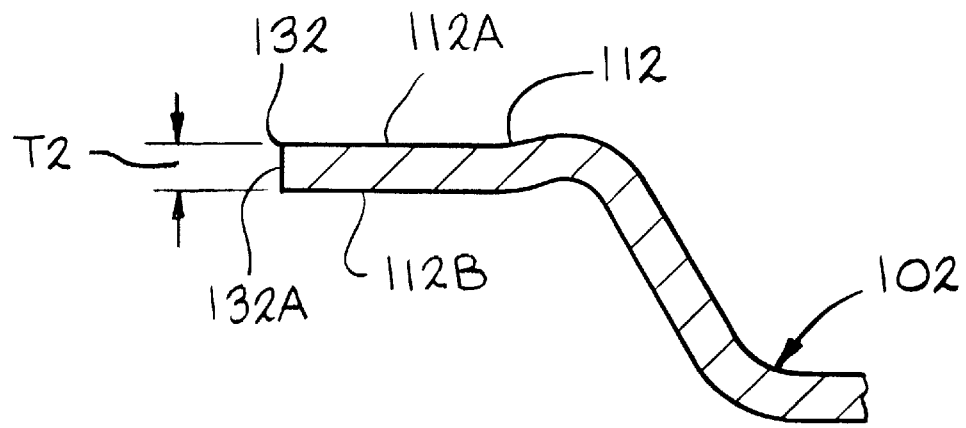
FIG. 11 is a cross-sectional view of the wheel rim illustrated in FIG. 10.

As best shown in FIG. 11, the outboard tire bead seat 112 of the wheel rim 102 includes an outer axially extending cylindrical surface 112A and an inner axially extending cylindrical surface 112B. The outer cylindrical surface 112A is substantially parallel to the inner cylindrical surface 112B to define a generally constant thickness T2 through the entire length of the outboard tire bead seat 112. The outboard tire bead seat 112 of the wheel rim 102 termites at an axial endmost surface 132. The axial endmost surface 132 includes a radially extending end surface 132A.

The wheel disc 104 is forged, cast, fabricated, or otherwise formed from steel, aluminum, magnesium, titanium, or other alloys and includes a generally centrally located wheel mounting surface 122 and an outer annular flange 124. The wheel mounting surface 122 is provided with a centrally located pilot aperture 126, and a plurality of lug bolt receiving holes 128 (only one lug bolt hole 128 being illustrated) circumferentially spaced around the pilot aperture 126. The lug bolt receiving holes 128 receive lug bolts and nuts (not shown) for securing the wheel 100 on an axle (not shown) of a vehicle. The outer annular flange 124 of the wheel disc 104 defines an inboard tire bead seat retaining flange 130 of the wheel 100. The wheel disc 104 may also include a plurality of decorative openings or windows 133 (only one window 133 being illustrated).

Figure 12:
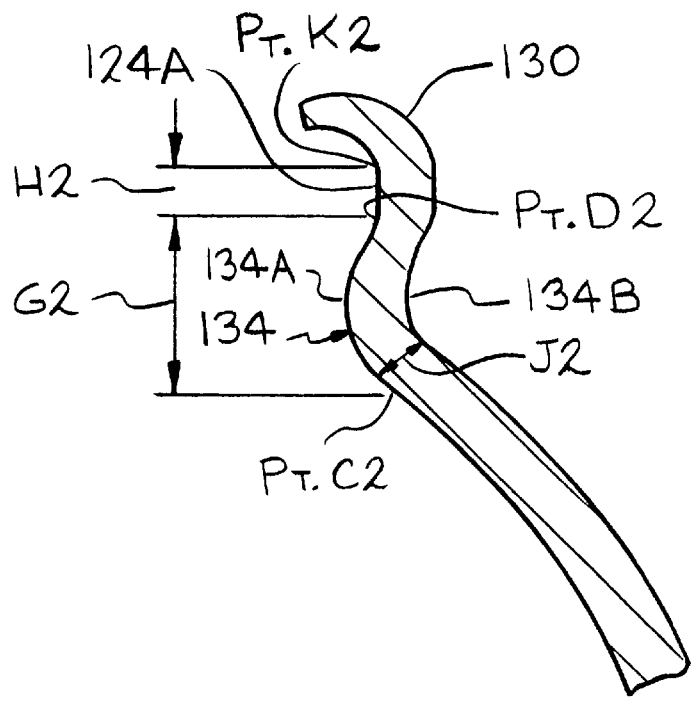
FIG. 12 is a cross-sectional view of the wheel disc illustrated in FIG. 10.

As best shown in FIG. 12, the outer annular flange 124 of the wheel disc 104 includes a protuberance, indicated generally at 134, formed therein. The protuberance 134 extends in a generally radial direction from approximately a point C2 to approximately a point D2 to define a length G2. The protuberance 134 defines a generally radially extending non-flat outer surface 134A and a generally radially extending non-flat inner surface 134B. The outer surface 134A is substantially parallel to the inner surface 134B to define a generally constant thickness J2 through the entire length G2 of the protuberance 134 of the wheel disc 104.

Figure 10:
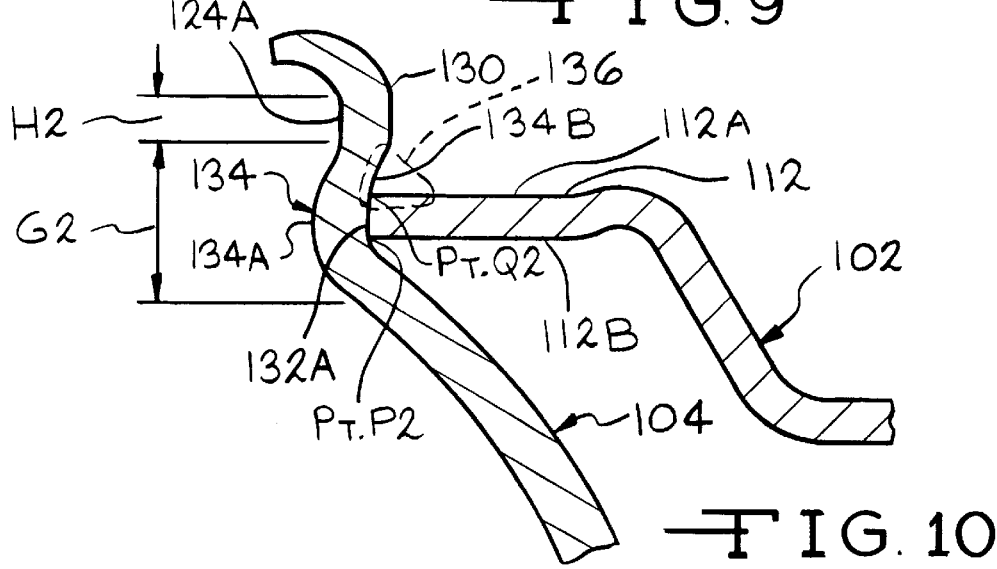
FIG. 10 is an enlarged cross-sectional view of a portion of the wheel illustrated in FIG. 9.

Typically, the thickness J2 of the wheel disc 104 in the region of the protuberance 134 is in the range of about 0.250 inch to about 0.40 inch for aluminum, and in the range of about 0.140 inch to about 0.250 inch for steel. The protuberance 134 is formed during the wheel disc forming process and may be formed by a suitable method, such as for example, by a stamping process, by a spinning process, or by combining stamping and spinning operations such as disclosed in U.S. Pat. No. 5,345,676 to Ashley, Jr. and U.S. Pat. No. 5,295,304 to Ashley, Jr. As will be discussed, the inner surface 134B of the protuberance 134 defines a "fit-up" surface for receiving the axial endmost surface 132 of the wheel rim 102. Preferably, as shown in FIG. 10, the fit-up surface extends from about a point P2 to about a point Q2, and is a generally flat surface formed by a suitable method, such as for example, by a machining operation or a stamping operation, to precise dimensions.

The outer flange 124 of the wheel disc 104 further defines a generally flat outer surface 124A which extends in a generally radial direction from approximately the point D2 to approximately a point K2 to define a radial length H2. As will be wheel discussed below, by forming the protuberance 134 in the outer flange 124 of the wheel disc 104, the length H2 of the outer flat surface 124A in the outer flange 124 of the wheel disc 104 is reduced compared to that of a similar sized prior art wheel disc for use in a similar prior art wheel construction.

To assemble the full face wheel 100, the axial endmost surface 132 of the wheel rim 102 is positioned adjacent the fit-up surface 134B of the wheel disc 104 in a predetermined position. In this position, a circumferential weld 136 is provided for joining the wheel disc 104 and the wheel rim 102 together to produce the full face wheel 100.

Figure 13:
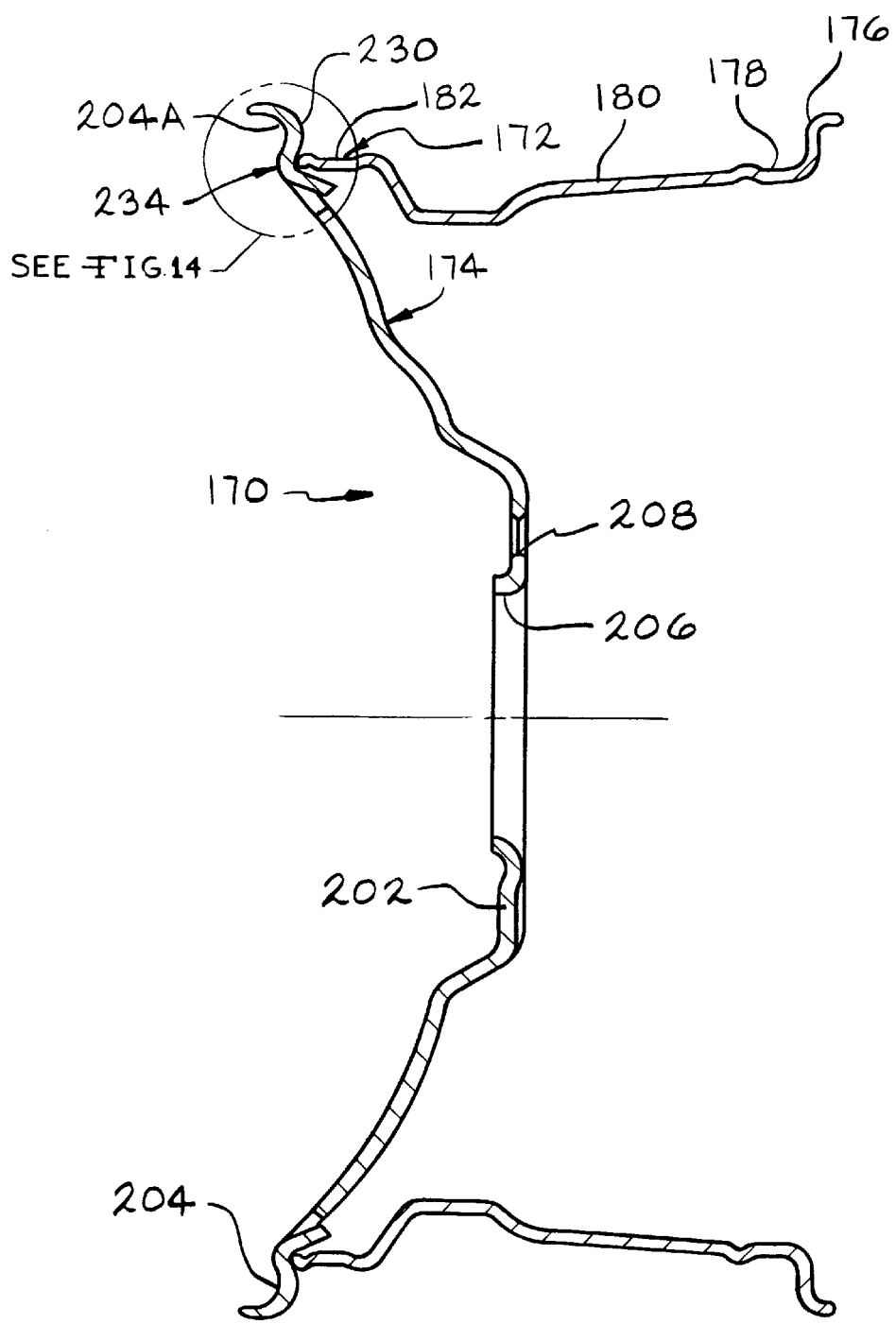
FIG. 13 is a cross-sectional view of a fourth embodiment of a full face vehicle wheel constructed in accordance with the present invention.

Turning now to FIG. 13, there is illustrated a fourth embodiment of a full face vehicle wheel, indicated generally at 170, constructed in accordance with the present invention. The full face vehicle wheel 170 includes a wheel rim 172 and a wheel disc 174 which are joined together during a welding operation.

The wheel rim 172 is a fabricated wheel rim formed from steel, aluminum, magnesium, titanium, or other alloys and includes an inboard tire bead seat retaining flange 176, an inboard tire bead seat 178, a generally axially extending well 180, and an outboard tire bead seat 182.

As best shown in FIG. 15, the outboard tire bead seat 182 of the wheel rim 172 includes an outer axially extending cylindrical surface 182A and an inner axially extending cylindrical surface 182B. The outboard tire bead seat 182 of the wheel rim 172 includes a hump or bulge-shaped outermost end 192 which is turned radially inwardly and termites at a radial endmost surface 194. The outermost end 192 can be formed by a suitable process, such as for example, by a rolling or spinning process. The outermost end 192 defines an outer surface 192A, and the radial endmost surface 194 of the outermost end 192 includes an axially extending end surface 194A. Alternatively, the shape of the outermost end 192 and/or the radial endmost surface 194 can be other than illustrated if desired.

The wheel disc 174 is forged, cast, fabricated, or otherwise formed from steel, aluminum, magnesium, titanium, or other alloys and includes a generally centrally located wheel mounting surface 202 and an outer annular flange 204. The wheel mounting surface 202 is provided with a centrally located pilot aperture 206, and a plurality of lug bolt receiving holes 208 (only one lug bolt hole 208 being illustrated) circumferentially spaced around the pilot aperture 206. The lug bolt receiving holes 208 receive lug bolts and nuts (not shown) for securing the wheel 170 on an axle (not shown) of a vehicle. The outer annular flange 204 of the wheel disc 174 defines an inboard tire bead seat retaining flange 230 of the wheel 170. The wheel disc 174 may also include a plurality of decorative openings or windows (not shown).

As best shown in FIG. 16, the outer annular flange 204 of the wheel disc 174 includes a non-flat or "protuberance", indicated generally at 234, formed therein. The protuberance 234 extends in a generally radial direction from approximately a point C3 to approximately a point D3 to define a length G3. The protuberance 234 defines a generally radially extending non-flat outer surface 234A and a generally radially extending non-flat inner surface 234B. The inner surface 234B can be formed by a suitable process, such as for example, by a stamping process or a machining process. The outer surface 234A is substantially parallel to the inner surface 234B to define a generally constant thickness J3 through the entire length G3 of the protuberance 234 of the wheel disc 174.

Typically, the thickness J3 of the wheel disc 174 in the region of the protuberance 234 is in the range of about 0.250 inch to about 0.40 inch for aluminum, and in the range of about 0.140 inch to about 0.250 inch for steel. The protuberance 234 is formed during the wheel disc forming process and may be formed by a suitable method, such as for example, by a stamping process, by a spinning process, or by combining stamping and spinning operations such as disclosed in U.S. Pat. No. 5,345,676 to Ashley, Jr. and U.S. Pat. No. 5,295,304 to Ashley, Jr. As will be discussed, the inner surface 234B of the protuberance 234 defines a "fit-up" surface for receiving the outermost end 192 of the wheel rim 172. Preferably, as shown in FIG. 14, the fit-up surface extends from about a point P3 to about a point Q3 and defines a predetermined curvature of profile which is generally complementary to the curvature of profile of the outer surface 192A of the outermost end 192 of the wheel rim 172. The fit-up surface 234B on the wheel disc 174 and the outer surface 192A on the wheel rim 172 are formed by a suitable method, such as for example, by a machining operation, a spinning operation, or a stamping operation, to precise dimensions.

The outer flange 204 of the wheel disc 174 further defines a generally flat outer surface 204A which extends in a generally radial direction from approximately the point D3 to approximately a point K3 to define a radial length H3. As will be discussed below, by forming the protuberance 234 in the outer flange 204 of the wheel disc 174, the length H3 of the outer flat surface 204A in the outer flange 204 of the wheel disc 174 is reduced compared to that of a similar sized prior art wheel disc for use in a similar prior art wheel construction.

To assemble the full face wheel 170, the outermost end 192 of the wheel rim 172 is positioned adjacent the fit-up surface 234B of the wheel disc 174 in a predetermined position. In this position, a circumferential weld 236 is provided for joining the wheel disc 174 and the wheel rim 172 together to produce the full face wheel 170.

Figure 17:
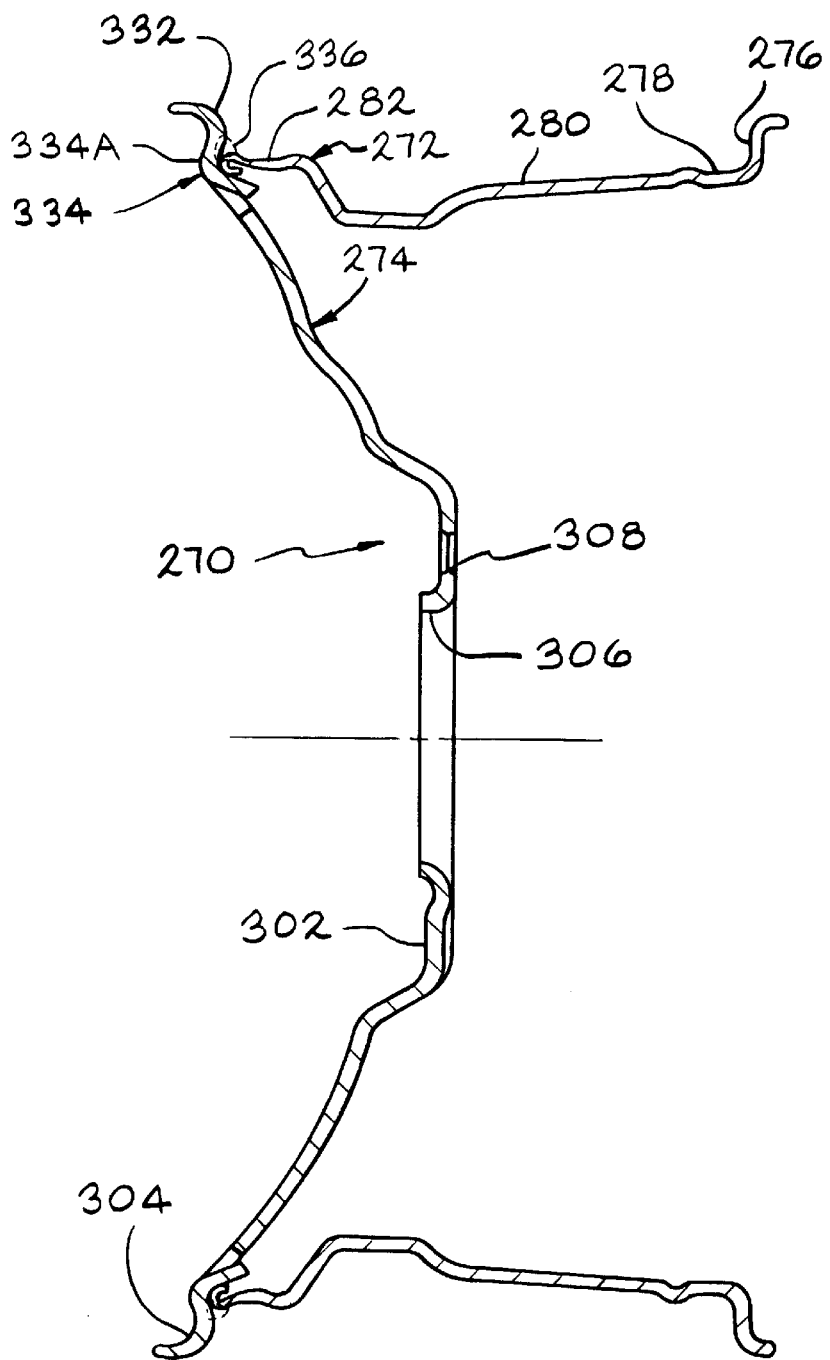
FIG. 17 is a cross-sectional view of a fifth embodiment of a full face vehicle wheel constructed in accordance with the present invention.

Turning now to FIG. 17, there is illustrated a fifth embodiment of a full face vehicle wheel, indicated generally at 270, constructed in accordance with the present invention. The full face vehicle wheel 270 includes a wheel rim 272 and a wheel disc 274 which are joined together during a welding operation.

The wheel rim 272 is a fabricated wheel rim formed from steel, aluminum, magnesium, titanium, or other alloys and includes an inboard tire bead seat retaining flange 276, an inboard tire bead seat 278, a generally axially extending well 280, and an outboard tire bead seat 282.

As best shown in FIG. 19, the outboard tire bead seat 282 of the wheel rim 272 includes an outer axially extending cylindrical surface 282A and an inner axially extending cylindrical surface 282B. The outboard tire bead seat 282 of the wheel rim 272 includes an inverted outermost end 292 which resembles a generally closed J-shape. The outermost end 292 can be formed by a suitable process, such as for example, by a rolling or spinning process followed by a beading process which is operative to bead or roll over the outermost end to produce a desired end shape. The outermost end 292 is of a reduced thickness TR compared to a thickness TO of the remainder of the outboard tire bead seat 282 of the wheel rim 272. The outermost end 292 of the wheel rim 272 defines an outer surface 292A and terminates at an axial endmost surface 294. The axial endmost surface 294 of the outermost end 292 includes a radially extending end surface 294A. Alternatively, the shape of the outermost end 292 and/or the axial endmost surface 294 can be other than illustrated if desired.

The wheel disc 274 is forged, cast, fabricated, or otherwise formed from steel, aluminum, magnesium, titanium, or other alloys and includes a generally centrally located wheel mounting surface 302 and an outer annular flange 304. The wheel mounting surface 302 is provided with a centrally located pilot aperture 306, and a plurality of lug bolt receiving holes 308 (only one lug bolt hole 308 being illustrated) circumferentially spaced around the pilot aperture 306. The lug bolt receiving holes 308 receive lug bolts and nuts (not shown) for securing the wheel 270 on an axle (not shown) of a vehicle. The outer annular flange 304 of the wheel disc 274 defines an inboard tire bead seat retaining flange 332 of the wheel 270. The wheel disc 274 may also include a plurality of decorative openings or windows (not shown).

As best shown in FIG. 20, the outer annular flange 304 of the wheel disc 274 includes a protuberance, indicated generally at 334, formed therein. The protuberance 334 extends in a generally radial direction from approximately a point C4 to approximately a point D4 to define a length G4. The protuberance 334 defines a generally radially extending non-flat outer surface 334A and a generally radially extending non-flat inner surface 334B. The inner surface 334B can be formed by a suitable process, such as for example, by a stamping process or a machining process. In the illustrated embodiment, the outer surface 334A is substantially parallel to the inner surface 334B to define a generally constant thickness J4 through the entire length G4 of the protuberance 334 of the wheel disc 274.

Typically, the thickness J4 of the wheel disc 274 in the region of the protuberance 334 is in the range of about 0.250 inch to about 0.40 inch for aluminum, and in the range of about 0.140 inch to about 0.250 inch for steel. The protuberance 334 is formed during the wheel disc forming process and may be formed by a suitable method, such as for example, by a stamping process, by a spinning process, or by combining stamping and spinning operations such as disclosed in U.S. Pat. No. 5,345,676 to Ashley, Jr. and U.S. Pat. No. 5,295,304 to Ashley, Jr. As will be discussed, the inner surface 334B of the protuberance 334 defines a "fit-up" surface for receiving the outermost end 292 of the wheel rim 272. Preferably, as shown in FIG. 18, the fit-up surface extends from about a point P4 to about a point Q4 and defines a predetermined curvature of profile which is generally complementary to the curvature of profile of the outer surface 292A of the outermost end 292 of the wheel rim 172. The fit-up surface 334B on the wheel disc 274 and the outer surface 292A on the wheel rim 172 are formed by a suitable method, such as for example, by a machining operation, a spinning operation, or a stamping operation, to precise dimensions.

The outer flange 304 of the wheel disc 274 further defines a generally flat outer surface 304A which extends in a generally radial direction from approximately the point D4 to approximately a point K4 to define a radial length H4. As will be wheel discussed below, by forming the protuberance 334 in the outer flange 304 of the wheel disc 274, the length H4 of the outer flat surface 304A in the outer flange 304 of the wheel disc 274 is reduced compared to that of a similar sized prior art wheel disc for use in a similar prior art wheel construction.

To assemble the full face wheel 270, the endmost end 292 of the wheel rim 272 is positioned adjacent the fit-up surface 334B of the wheel disc 274 in a predetermined position. In this position, a circumferential weld 336 is provided for joining the wheel disc 274 and the wheel rim 272 together to produce the full face wheel 270.

Figure 21:
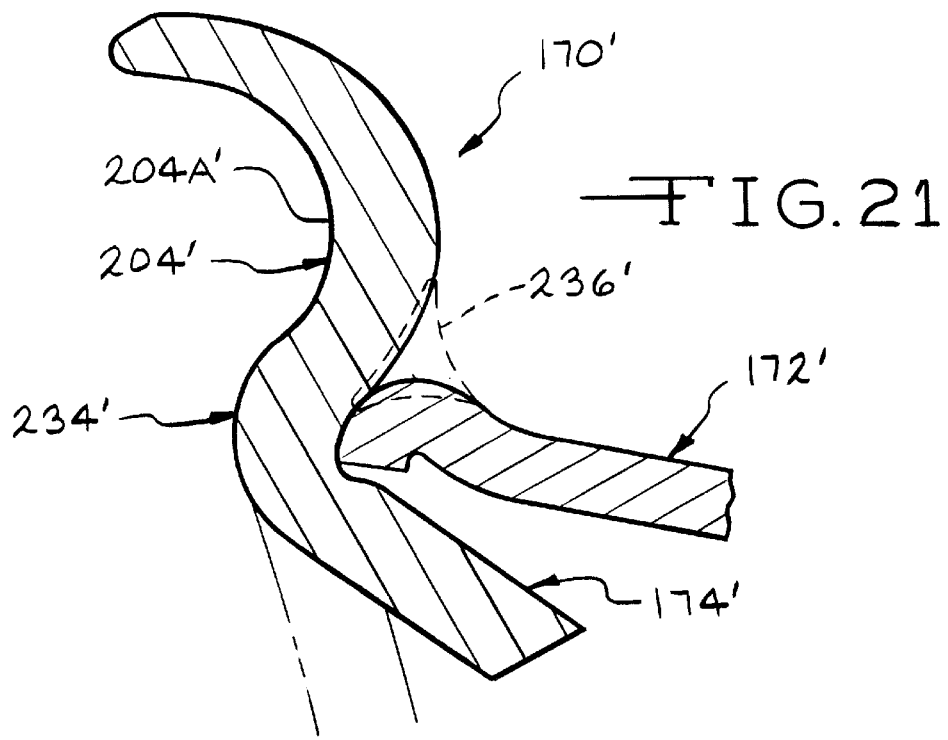
FIG. 21 is an enlarged cross-sectional view of a sixth embodiment of a portion of a full face vehicle wheel constructed in accordance with this invention.
Figure 22:
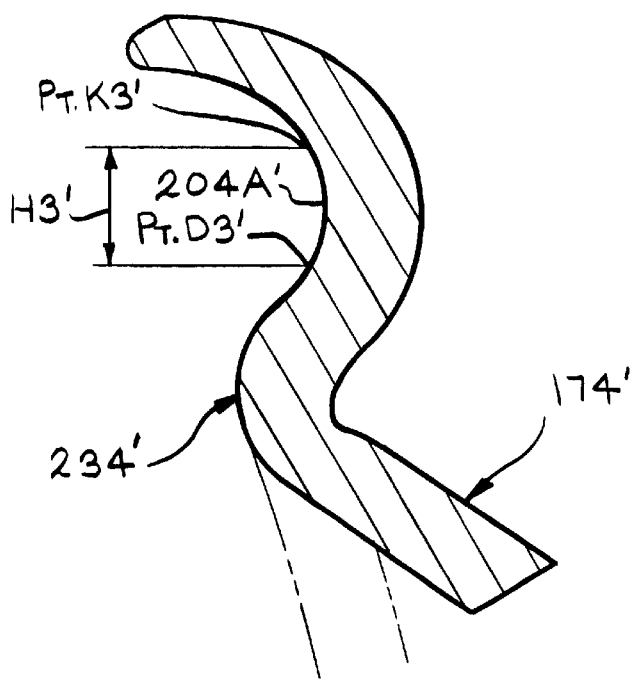
FIG. 22 is a cross-sectional view of the wheel disc illustrated in FIG. 21.

Turning now to FIG. 21, there is illustrated a portion of a sixth embodiment of a full face vehicle wheel, indicated generally at 170', constructed in accordance with the present invention. The full face vehicle wheel 170' is similar to the full face vehicle wheel 170 illustrated in FIGS. 13–16 except that the outer flange 204' of the wheel disc 174' defines a generally non-flat outer surface 204A'. As shown in FIG. 22, the non-flat outer surface 204A' extends in a generally radial direction from approximately point D3' to approximately point K3' to define a radial length H3'.

Figure 23:
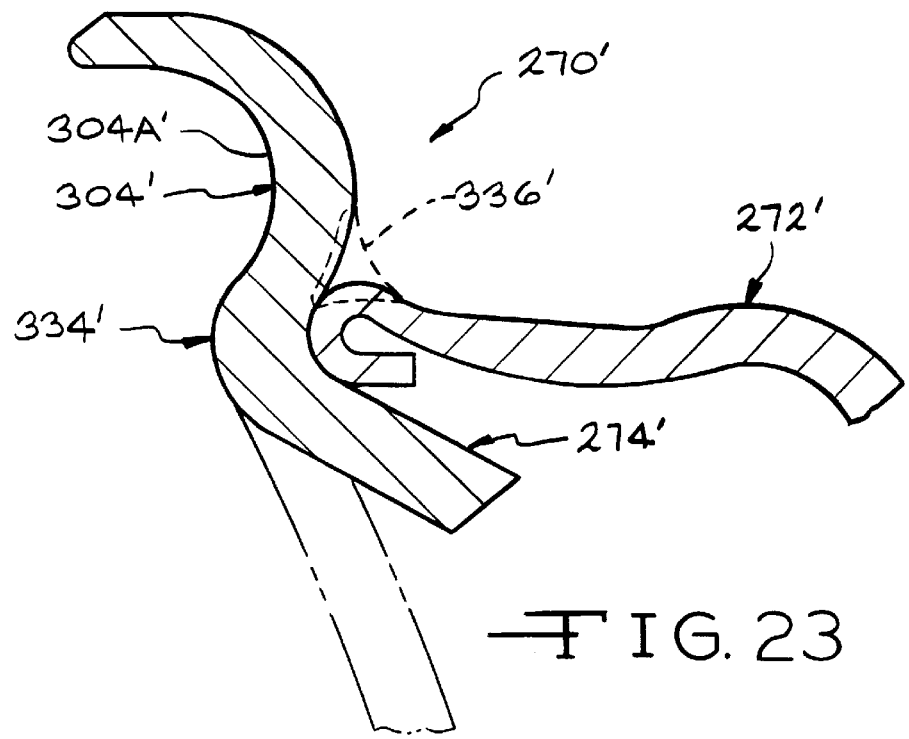
FIG. 23 is an enlarged cross-sectional view of a seventh embodiment of a portion of a full face vehicle wheel constructed in accordance with this invention.
Figure 24:
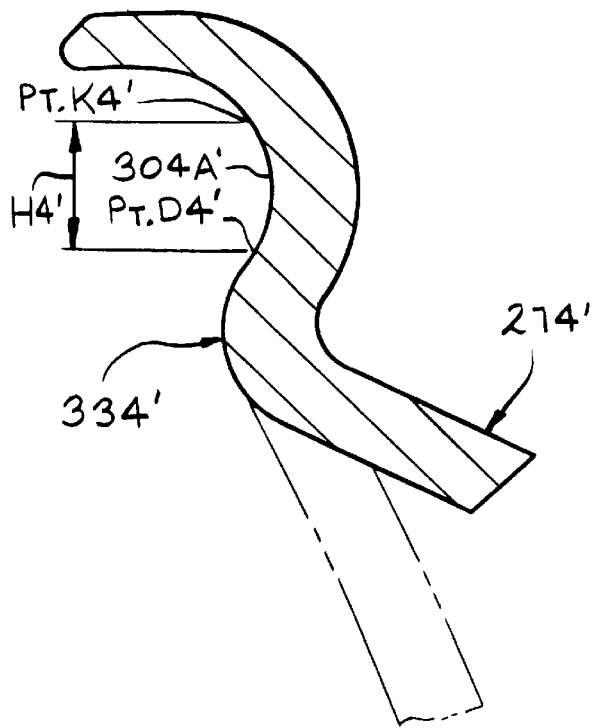
FIG. 24 is a cross-sectional view of the wheel disc illustrated in FIG. 23.

Turning now to FIG. 23, there is illustrated a portion of a seventh embodiment of a full face vehicle wheel, indicated generally at 270', constructed in accordance with the present invention. The full face vehicle wheel 270' is similar to the full face vehicle wheel 270 illustrated in FIGS. 17–20 except that the outer flange 304' of the wheel disc 274' defines a generally non-flat outer surface 304A'. As shown in FIG. 24, the non-flat outer surface 304A' extends in a generally radial direction from approximately point D4' to approximately point K4' to define a radial length H4'.

Figure 25:
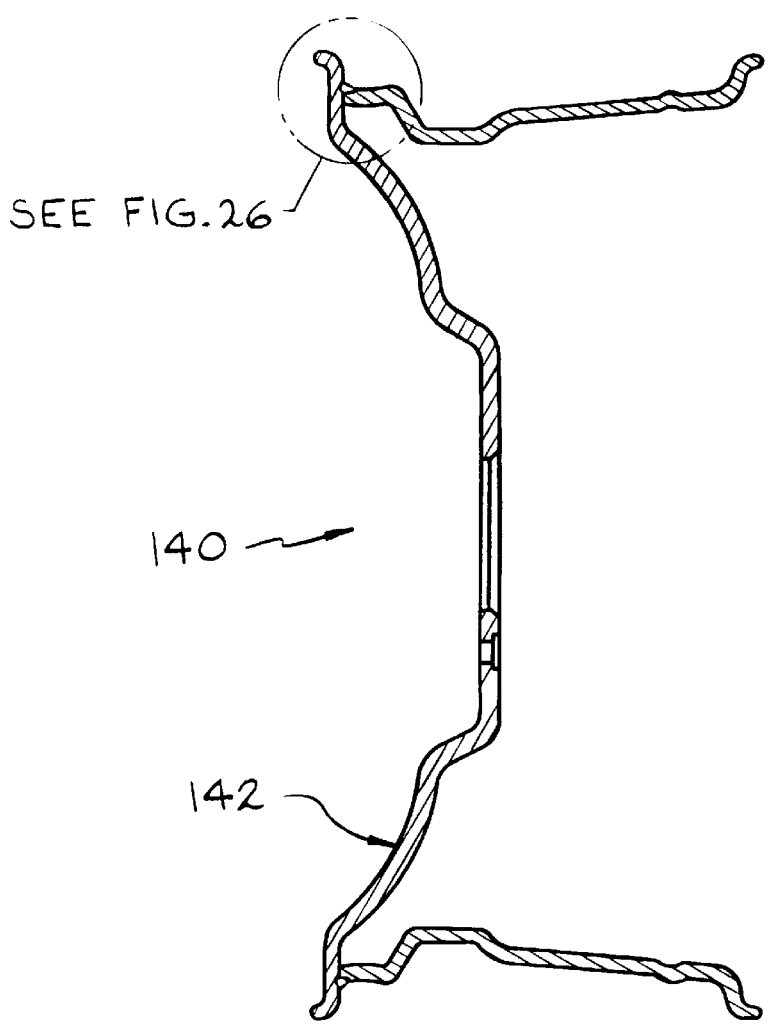
FIG. 25 is a cross-sectional view of a prior art full face vehicle wheel.
Figure 26:
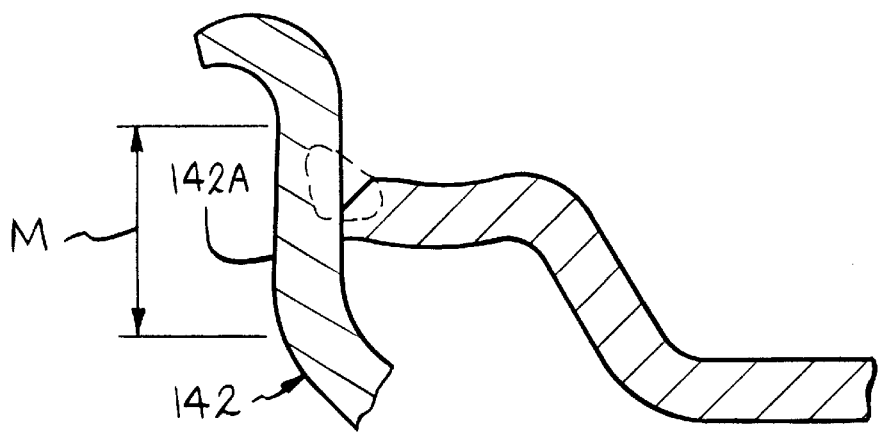
FIG. 26 is an enlarged cross-sectional view of a portion of the prior art full face vehicle wheel illustrated in FIG. 25.
Figure 27:
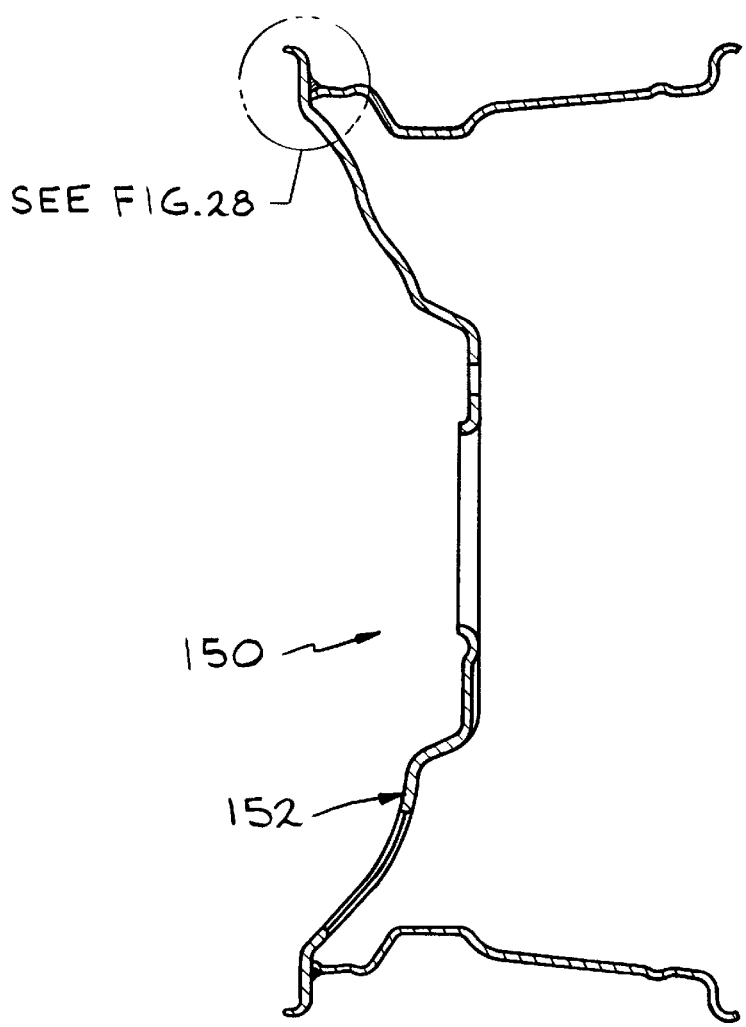
FIG. 27 is a cross-sectional view of another prior art full face vehicle wheel.
Figure 28:
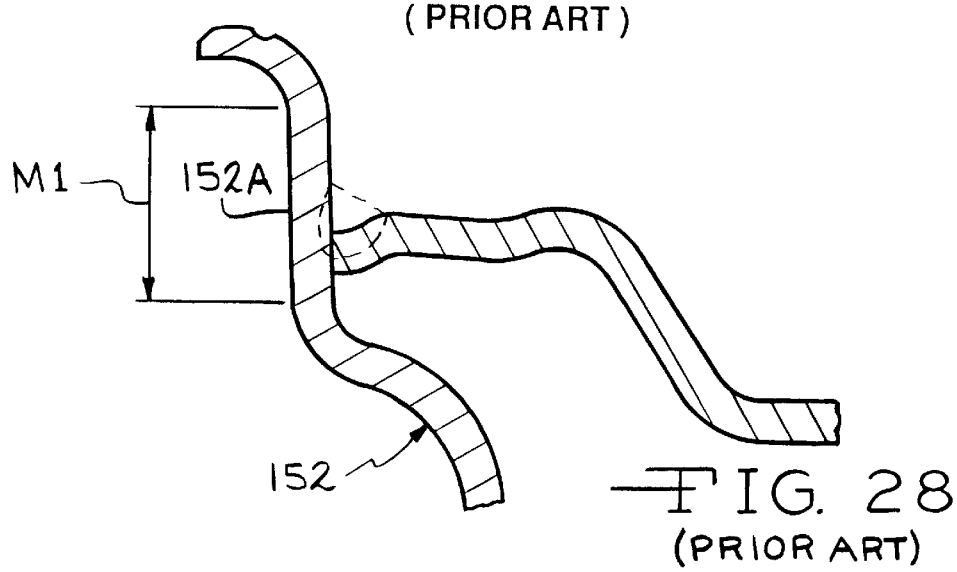
FIG. 28 is an enlarged cross-sectional view of a portion of the prior art full face vehicle wheel illustrated in FIG. 27.
Figure 29:
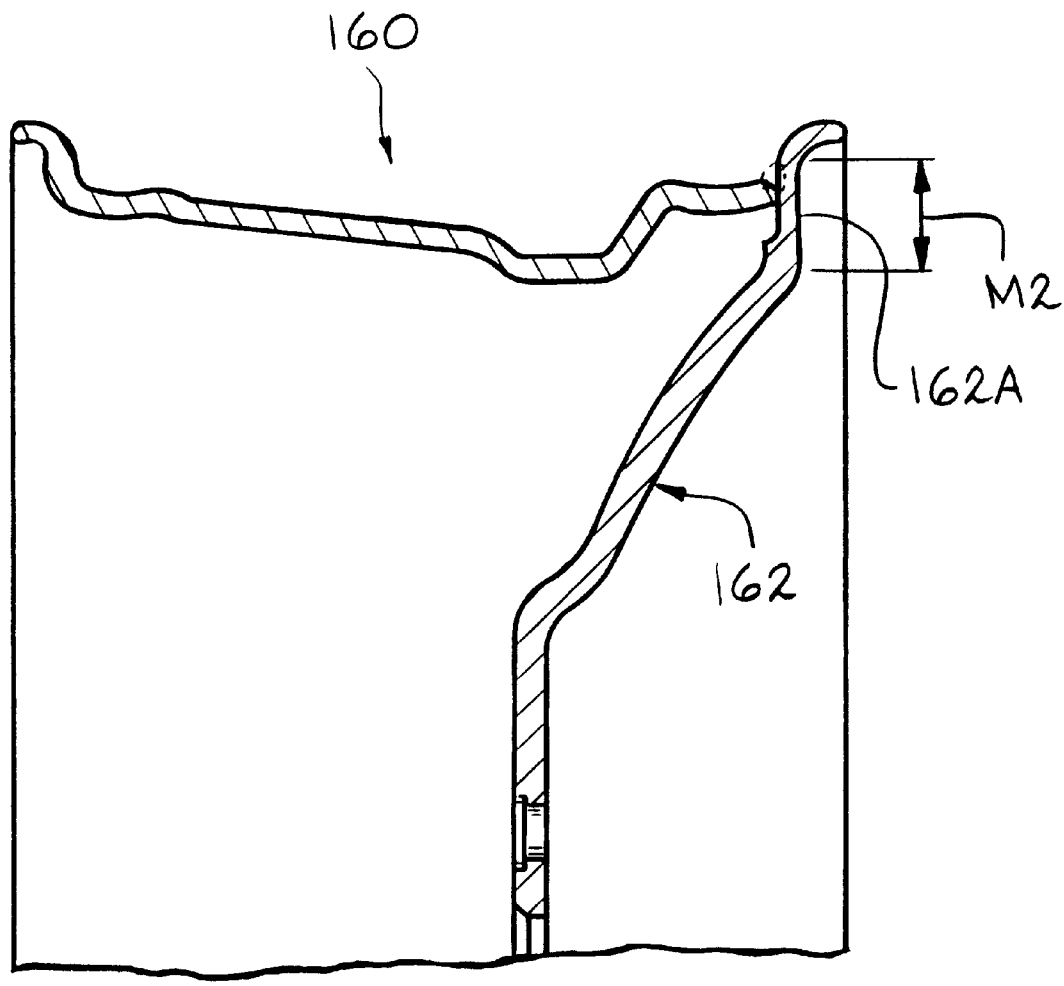
FIG. 29 is a cross-sectional view of a portion of yet another prior art full face vehicle wheel.

One advantage of this invention is that the respective protuberances 50, 94, 134, 234, and 334 in the wheel discs 14, 64, 104, 174, and 274 improve the styling of the associated full face wheels 10, 60, 100, 170, and 270 by reducing the radial lengths H, H1, H2, H3, and H4 of the generally flat outer surfaces 34A, 84A, 124A, 204A, and 304A in the outer flanges 34, 84, 124, 204, and 304 thereof. For example, this is shown comparing the radial length H of the flat outer surface 34A of the wheel disc 14 of the full face vehicle wheel 10 shown in FIGS. 2 and 4 of this invention to a radial length M defined by a flat outer surface 142A of a prior art wheel disc 142 of a prior art full face wheel 140 shown in prior art FIGS. 25 and 26 (prior art FIGS. 25 and 26 correspond to FIGS. 2 and 3 of U.S. Pat. No. 5,435,633 to Jaskierny); the radial length H1 of the flat outer surface 84A of the wheel disc 64 of the full face vehicle wheel 60 shown in FIGS. 6 and 8 of this invention to a radial length M1 defined by a flat outer surface 152A of a prior art wheel disc 152 of a prior art full face wheel 150 shown in prior art FIGS. 27 and 28 (prior art FIGS. 27 and 28 correspond to FIGS. 2 and 3 of U.S. Pat. No. 5,435,632 to Gajor et al.,); and the radial length H2 of the flat outer surface 124A of the wheel disc 104 of the full face vehicle wheel 100 shown in FIGS. 10 and 12 of this invention to a radial length M2 defined by a flat outer surface 162A of a prior art wheel disc 162 of a prior art full face wheel 160 shown in prior art FIG. 29 (prior art FIG. 29 corresponds to FIG. 9 of U.S. Pat. No. 5,345,676 to Ashley, Jr.). Another advantage of this invention is that the protuberances 234' and 334' and the associated non-flat outer surfaces 204A' and 304A' in the wheel discs 174' and 274', respectively, are effective to eliminate the above-described flat surfaces in prior art FIGS. 25–28. Yet a further advantage of this invention is that the respective protuberances 50, 94, 134, 234, 334, 234', and 334' in the wheel discs 14, 64, 104, 204, 304, 204', and 304' are effective to move the associated welds 52, 96, 136, 236, 336, 236' and 336' further from the bead of the tire. As a result, it may not be necessary to machine the welds 52, 96, 136, 236, 336, 236', and 336' in order to have the weld clear the bead of the tire. A further advantage of this invention is that the weld joint geometry in the full face wheels 10, 60, 100, 170, 270, 170', and 270' may increase the strength of the associated weld joint thereby improving the fatigue life of the full face wheels.

Although the invention has been described and illustrated in connection with the particular vehicle wheel constructions disclosed herein, it will be appreciated that the vehicle wheel constructions can be other than illustrated. For example, any one of the wheel rims 12, 62, 102, 172, 272, 172', and 272' may be used with any one of the full face wheel discs 14, 64, 104, 174, 274, 174', and 274' to produce a desired full face vehicle wheel.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A full face vehicle wheel comprising:
   a wheel rim defining an axis and including an inboard tire bead seat retaining flange, an inboard tire bead seat, an axially extending well, and an outboard tire bead seat, said outboard tire bead seat terminating at an endmost surface;
   a wheel disc joined to said wheel rim, said wheel disc including a body having a centrally located wheel mounting surface and an outer annular portion, said outer annular portion of said wheel disc defining an outboard tire bead seat retaining flange of the full face vehicle wheel; and
   said outer annular portion of said wheel disc having a protuberance formed therein, said protuberance defining a generally radially extending non-flat outer surface and a generally radially extending inner surface, said inner surface defining a fit-up surface for receiving said endmost surface of said wheel rim and a weld to join said wheel disc to said wheel rim to produce the full face vehicle wheel, said protuberance extending continuously around an entire circumference of said outer annular portion of said wheel disc.

2. The full face vehicle wheel defined in claim 1 wherein said non-flat outer surface of said protuberance extends generally parallel to inner surface of said protuberance so as to define a generally constant thickness throughout an entire length of said protuberance.

3. The full face vehicle wheel defined in claim 1 wherein said outer annular portion of said wheel disc includes a generally flat outer surface extending generally radially outwardly from an outer peripheral end of said protuberance toward an outermost peripheral end of said wheel disc.

4. The full face vehicle wheel defined in claim 1 wherein said outer annular portion of said wheel disc includes a generally non-flat outer surface extending generally radially outwardly from an outer peripheral end of said protuberance toward an outermost peripheral end of said wheel disc.

5. The full face vehicle wheel defined in claim 1 wherein said fit-up surface is a generally flat surface.

6. The full face vehicle wheel defined in claim 1 wherein said fit-up surface is a non-flat surface.

7. The full face vehicle wheel defined in claim 1 wherein said endmost surface of said rim is an axial endmost surface and includes a radially extending first end surface and a non-radially extending chamfered second end surface, wherein when said axial endmost surface of said wheel rim is positioned adjacent said fit-up surface of said protuberance, said radially extending first end surface of said wheel rim abuts said fit-up surface of said protuberance of said wheel disc, and said non-radially extending chamfered second end surface of said wheel rim is spaced from and cooperates with said fit-up surface of said protuberance to form a generally annular groove for receiving a weld to join said wheel rim and said wheel disc together and produce the finish full face wheel.

8. The full face vehicle wheel defined in claim 1 wherein said outboard tire bead seat including a first section defining a first axial outer surface, a second section defining second axial parallel outer and inner surfaces, and a generally radially extending transition section connecting said first section and said second section with said second axial outer surface spaced radially inwardly relative to said first axial outer surface, said second section terminating at an axial endmost surface, wherein, when said axial endmost surface of said second section is positioned against said fit-up surface of said wheel disc, a recess is formed between said second axial outer surface and said fit-up surface of said wheel disc, said recess defining an axially extending groove for receiving a weld to join said wheel rim and said wheel disc together and produce the finish full face fabricated wheel.

9. The full face vehicle wheel defined in claim 1 wherein said endmost surface of said rim is turned radially inwardly and termites at a radial endmost surface.

10. The full face vehicle wheel defined in claim 1 wherein said endmost surface of said rim is inverted to resemble a generally closed J-shape.

11. A full face vehicle wheel comprising:
    a wheel rim defining an axis and including an inboard tire bead seat retaining flange, an inboard tire bead seat, an axially extending well, and an outboard tire bead seat, said outboard tire bead seat terminating at an endmost surface;
    a wheel disc joined to said wheel rim, said wheel disc including a body having a centrally located wheel mounting surface and an outer annular portion, said outer annular portion of said wheel disc defining an outboard tire bead seat retaining flange of the full face vehicle wheel; and
    said outer annular portion of said wheel disc having a protuberance formed therein, said protuberance defining a generally radially extending non-flat outer surface and a generally radially extending inner surface, said inner surface defining a fit-up surface for receiving said endmost surface of said wheel rim and a weld to join said wheel disc to said wheel rim to produce the full face vehicle wheel, said outer annular portion of said wheel disc further including a generally flat outer surface extending generally radially outwardly from an outer peripheral end of said protuberance toward an outermost peripheral end of said wheel disc, said non-flat outer surface of said protuberance extending a first generally radial distance and said generally flat outer surface of said outer annular portion of said wheel disc extending a second generally radial distance which is less than said first radial distance.

12. A full face vehicle wheel comprising:

a rim defining an axis and including an inboard tire bead seat retaining flange, an inboard tire bead seat, an axially extending well, and an outboard tire bead seat, said outboard tire bead seat terminating at an endmost surface;

a disc joined to said rim, said disc including a body having a centrally located wheel mounting surface and an outer annular portion, said outer annular portion defining an outboard tire bead seat retaining flange of the full face wheel; and said outer annular portion of said disc having a protuberance formed therein, said protuberance defining a generally radially extending non-flat first outer surface and generally radially extending first inner surface, said first inner surface defining a fit-up surface for receiving said endmost surface of said rim and a weld to join said disc to said rim, said outer annular portion further including a second outer surface extending generally radially outwardly from an outer peripheral end of said protuberance toward an outermost peripheral end of said disc, said non-flat first outer surface of said protuberance extending a first radial distance and said second outer surface of said outer annular portion of said disc extending a second radial distance which is less than said first radial distance.

13. The full face vehicle wheel defined in claim 12 wherein said second outer surface of said outer annular portion of said wheel disc includes a generally flat outer surface extending generally radially outwardly from an outer peripheral end of said protuberance toward an outermost peripheral end of said wheel disc.

14. The full face vehicle wheel defined in claim 12 wherein said second outer surface of said outer annular portion of said wheel disc includes a generally non-flat outer surface extending generally radially outwardly from an outer peripheral end of said protuberance toward an outermost peripheral end of said wheel disc.

15. The full face vehicle wheel defined in claim 12 wherein said fit-up surface is a generally flat surface.

16. The full face vehicle wheel defined in claim 12 wherein said fit-up surface is a non-flat surface.

17. The full face vehicle wheel defined in claim 12 wherein said outboard tire bead seat includes a first section defining a first axial outer surface, a second section defining second axial parallel outer and inner surfaces, and a generally radially extending transition section connecting said first section and said second section with said second axial outer surface spaced radially inwardly relative to said first axial outer surface, said second section terminating at an axial endmost surface, wherein, when said axial endmost surface of said second section is positioned against said fit-up surface of said wheel disc, a recess is formed between said second axial outer surface and said fit-up surface of said wheel disc, said recess defining an axially extending groove for receiving a weld to join said wheel rim and said wheel disc together and produce the finish full face fabricated wheel.

18. The full face vehicle wheel defined in claim 12 wherein said endmost surface of said rim is an axial endmost surface and includes a radially extending first end surface and a non-radially extending chamfered second end surface, wherein when said axial endmost surface of said wheel rim is positioned adjacent said fit-up surface of said protuberance, said radially extending first end surface of said wheel rim abuts said fit-up surface of said protuberance of said wheel disc, and said non-radially extending chamfered second end surface of said wheel rim is spaced from and cooperates with said fit-up surface of said protuberance to form a generally annular groove for receiving a weld to join said wheel rim and said wheel disc together and produce the finish full face wheel.

19. The full face vehicle wheel defined in claim 12 wherein said endmost surface of said rim is turned radially inwardly and termites at a radial endmost surface.

20. The full face vehicle wheel defined in claim 12 wherein said endmost surface of said rim is inverted to resemble a generally closed J-shape.

* * * * *